(No Model.)
J. F. CARTER & T. SEELY.
SAW MILL.
No. 279,537. Patented June 19, 1883.
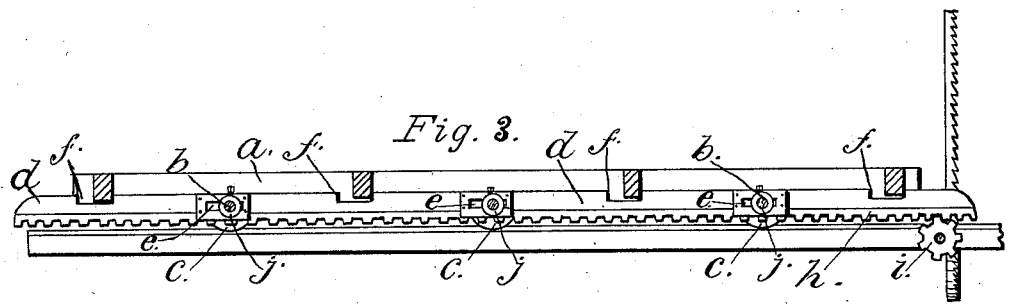
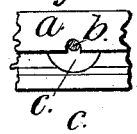
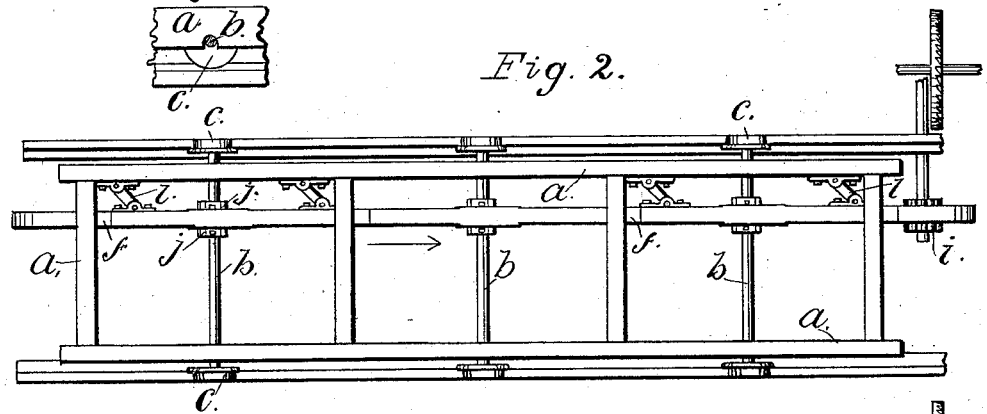
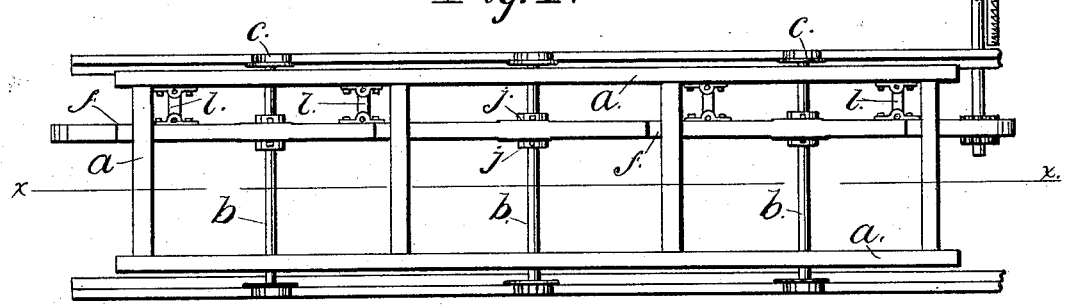
Witnesses:
Georgie Carter.
H. P. Hood.
Inventors:
James F. Carter
Thomas Seely

UNITED STATES PATENT OFFICE.

JAMES F. CARTER AND THOMAS SEELY, OF INDIANAPOLIS, INDIANA.

SAW-MILL.

SPECIFICATION forming part of Letters Patent No. 279,537, dated June 19, 1883.

Application filed March 5, 1883. (No model.)

*To all whom it may concern:*

Be it known that we, JAMES F. CARTER and THOMAS SEELY, citizens of the United States, residents of Indianapolis, in the county of Marion and State of Indiana, have invented a new and useful Improvement in Saw-Mills, of which the following is a specification, having reference to the accompanying drawings.

Our invention relates to an improvement in the log-carriage of a saw-mill; and its object is to prevent the cut surface of the log from coming in contact with the side of the saw during the backward movement of the carriage. This object we attain by causing the carriage, with the log upon it, to have a slight transverse movement, as hereinafter fully explained.

The accompanying drawings illustrate our invention.

Figure 1 is a plan showing the position of the carriage and its several parts during its forward movement. Fig. 2 is a plan showing the position of the carriage and its several parts during its backward movement. Fig. 3 is an enlarged partial elevation of one of the carriage-trucks and side of the carriage. Fig. 4 is a longitudinal section through *x x*, Fig. 1.

Like letters indicate the same parts in all the figures.

A rectangular frame, *a*, adapted to receive and carry on its upper surface any ordinary style of head-block, has on its under surface suitable bearings, which rest on the axles *b b* of the trucks *c c*. The flanges of the trucks fit nicely between the rails of the carriage-way in the usual manner. The space between the trucks forming each pair is longer than the width of the carriage-frame *a*, and said frame is free to slide in the direction of its width upon the axles connecting said trucks. A beam, *d*, extends lengthwise beneath frame *a*, having slots *e*, through which the axles *b* pass, and notches *f f* on its upper surface, through which the cross-timbers of frame *a* pass. To the beam *d* the feed mechanism is connected for moving the carriage in the direction of its length toward and from the saw. Any suitable mechanism may be used for this purpose. We have here shown the ordinary rack and pinion, *h i*. Beam *d* is not rigidly secured to the carriage-frame, as is the case with the usual rack-beam; but it rests on the axles *b*, between collars *j j*, a pair of which are rigidly secured to each of the said axles, the faces of the collars resting against suitable friction-plates on the sides of beam *d*, the effect being to prevent all lateral motion of the beam on the axle. Frame *a* is connected at intervals with beam *d* by links *l l*, of which there may be two or more, each of which is pivoted at one end to the frame and at the other end to the beam.

The operation of our device is as follows: The carriage having ceased its forward movement and being in the position shown in Fig. 1, the feed mechanism is reversed, and the beam *d*, not being rigidly secured to the frame *a*, moves in the direction indicated by the arrow in Fig. 2 before the frame begins to move, thus bringing links *l l* into an inclined position, as shown in Fig. 2, thus shortening the space between the beam and the side of the frame to which the links are attached. As the beam is prevented by collars *j j* from moving sidewise, the frame *a*, carrying the head-blocks and log, is drawn toward the beam and away from the side of the saw. As soon as the sides of notches *f* come in contact with the cross-timbers of the frame the frame also begins to move with the beam. When the movement of the beam is stopped the momentum of the frame carries it still farther, until the cross-timbers thereof come in contact with the opposite sides of notches *f f*, and the links are restored to their first position, thus pushing the frame and log toward the side of the saw. The log is then set by the head-blocks in the usual manner for another cut. When it is desired to back the log after making a partial cut, it is only necessary to put a block or other stop in one of the notches *f*, thus filling the notch and causing the frame to start as soon as the beam, and preventing the transverse movement of the frame.

We claim as our invention—

1. In a saw-mill, a log-carriage consisting of a series of trucks, a frame mounted on said trucks and adapted to move transversely thereon and to support a log, a draft-beam adapted to move longitudinally in relation to said frame at each forward and backward movement thereof, and means for connecting said draft-beam with the trucks and with the frame, whereby the frame is moved transversely by the longitudinal movement of the draft-beam, substantially as shown and described.

2. The combination, with a log-carriage in a saw-mill, of a draft-beam mounted therewith and adapted to have a limited longitudinal movement in relation thereto at each forward and backward movement thereof, substantially as and for the purpose specified.

3. In a saw-mill, the combination, with a saw, a fixed track by the side thereof, and a series of trucks, or their equivalent, adapted to move along said track and occupying a fixed position transversely thereon, of a frame adapted to support a log mounted on said trucks, or their equivalent, and adapted to have a transverse movement thereon, substantially as and for the purpose set forth.

4. In a saw-mill, a log-carriage consisting of frame $a$, a series of trucks supporting said frame, a draft-beam, $d$, adapted to move longitudinally between collars $j\ j$, and links $l\ l$, connecting said draft-beam and frame, all combined, substantially as shown and described, for the purpose specified.

JAMES F. CARTER.
THOMAS SEELY.

Witnesses:
GEORGIE CARTER,
H. P. HOOD.